United States Patent
Hartung et al.

(10) Patent No.: US 10,637,866 B2
(45) Date of Patent: Apr. 28, 2020

(54) TECHNIQUE FOR REGISTERING A DEVICE WITH A RIGHTS ISSUER SYSTEM

(75) Inventors: Frank Hartung, Steinweg (DE); Uwe Horn, Am Branderhof (DE); Markus Kampmann, Bremenburg (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 3518 days.

(21) Appl. No.: 11/718,585

(22) PCT Filed: Nov. 8, 2004

(86) PCT No.: PCT/EP2004/012621
§ 371 (c)(1),
(2), (4) Date: Jul. 25, 2008

(87) PCT Pub. No.: WO2006/048039
PCT Pub. Date: May 11, 2006

(65) Prior Publication Data
US 2009/0064341 A1  Mar. 5, 2009

(51) Int. Cl.
*G06Q 30/00* (2012.01)
*H04L 29/06* (2006.01)
(Continued)

(52) U.S. Cl.
CPC ............ *H04L 63/102* (2013.01); *G06F 21/10* (2013.01); *H04N 21/2541* (2013.01);
(Continued)

(58) Field of Classification Search
USPC ...................................................... 705/50–79
See application file for complete search history.

(56) References Cited

U.S. PATENT DOCUMENTS 4,625,276 A * 11/1986 Benton .................. G06Q 20/00
235/379
6,557,105 B1 * 4/2003 Tardo ..................... G06F 21/105
713/170
(Continued)

FOREIGN PATENT DOCUMENTS

EP       1 043 906 A    10/2000
EP       1150198 A2 *   10/2001 ............. G06F 21/10
(Continued)

OTHER PUBLICATIONS

•Microsoft. Smart Client Architecture and Design Guide. (Oct. 15, 2003). Retrieved online Mar. 4, 2020.https://download.microsoft.com/download/9/a/1/9a1115fd-8ba8-4aa0-a82e-07044bd12ac0/SCAG.pdf (Year: 2003).*
(Continued)

*Primary Examiner* — James A Reagan

(57) ABSTRACT

A technique for registering a device (10) with a rights issuer system (12) in a digital rights management (DRM) context is described. The device (10) is provided with DRM registration information that is required to use protected content. The DRM registration information is generated from rights issuer information on the one hand and device information on the other hand. The DRM registration technique described herein does not require an interactive registration protocol between a rights issuer server (12) and the device (10). Rather, the DRM registration information may be generated and transferred to the device (10) even if the device (10) is offline, inactive or switched-off.

21 Claims, 5 Drawing Sheets

(51) Int. Cl.
*H04N 21/254* (2011.01)
*H04N 21/433* (2011.01)
*H04N 21/436* (2011.01)
*G06F 21/10* (2013.01)
*H04N 21/4627* (2011.01)

(52) U.S. Cl.
CPC ....... *H04N 21/436* (2013.01); *H04N 21/4334* (2013.01); *H04N 21/4627* (2013.01); *H04L 2463/101* (2013.01)

(56) References Cited

U.S. PATENT DOCUMENTS

| | | | | |
|---|---|---|---|---|
| 2001/0042125 | A1* | 11/2001 | Watanabe | G06Q 20/04 709/227 |
| 2002/0051539 | A1* | 5/2002 | Okimoto | H04N 7/165 380/211 |
| 2002/0068554 | A1 | 6/2002 | Dusse | |
| 2003/0023561 | A1* | 1/2003 | Stefik | G06F 21/10 705/51 |
| 2003/0116829 | A1 | 6/2003 | Yazdy et al. | |
| 2004/0078066 | A1 | 4/2004 | Ohta et al. | |
| 2004/0107368 | A1* | 6/2004 | Colvin | G06F 21/121 726/30 |
| 2006/0056324 | A1* | 3/2006 | Hyyppa | G06Q 20/123 370/310 |

FOREIGN PATENT DOCUMENTS

| | | | | |
|---|---|---|---|---|
| JP | 2000354124 | A * | 12/2000 | ......... H04N 1/00424 |
| JP | 2000357201 | A * | 12/2000 | ............. G06F 17/60 |
| JP | 2004-007297 | A | 1/2004 | |

OTHER PUBLICATIONS

Lahtinen, et al "IPDC Services Purchase and Protection. Joint Response to the DVB CfT by Digita, Elisa, MTV Oy, NEC, Nokia, Phillips, Siemens, Swelcom, Telecom Italia Lab, TeliaSonera, T-System and Vodafone" Version 1.0. Sep. 16, 2004.

Open Mobile Alliance: "DRM Specification—Candidate Version 2.0 (OMA-DRM-DRM-V2_0-20040716-C)" OMA, 'Online! Jul. 16, 2004 (Jul. 16, 2004), XP002337407 Retrieved from the Internet: URL:http://www.openmobilealliance.org/release_program/docs/DRM/V2_0-20040715-C/OMA-DRM-DRM-V2_0-20040716-C.pdf> retrieved on Jul. 21, 2005! Section 5 and subsections. Section 14.

"DRM Architecture—Candidate Version 2.0" Announcement Open Mobile Alliance, Jul. 15, 2004 (Jul. 15, 2004), pp. 1-24, XP002310145 section 4.3.4. section 4.3.8 section 6 and subsections.

* cited by examiner

TECHNIQUE FOR REGISTERING A DEVICE WITH A RIGHTS ISSUER SYSTEM

FIELD OF THE INVENTION

The invention relates to digital rights management. More specifically, the invention relates to a technique for efficiently registering a device with a rights issuer system in context with providing the device with information required to use protected content.

BACKGROUND OF THE INVENTION

Digital Rights Management (DRM) is a set of technologies that provide the basis to control the distribution and consumption of digital content such as a ringing tone, a screen saver, a Java game, an image or a piece of music. In order to enhance the acceptance of DRM, standardization of DRM technologies has become an important issue. The Open Mobile Alliance (OMA) for example has specified the OMA DRM 2.0 standard for the protection of multimedia data on mobile telephones and other devices.

According to the OMA DRM 2.0 standard, digital content is protected by encryption and by packaging into a special DRM format (the DRM Content Format, such as DCF or PDCF). A key to decrypt the digital content is transferred in a so-called rights object. The rights object is issued by a rights issuer that may also distribute the rights object to the DRM capable device. The rights object is protected by encryption with a device specific public key that is stored in a DRM certificate. In addition to its public key, each DRM capable device has a private key for decrypting the rights object individually encrypted for this device.

Before a rights issuer can distribute a rights object to a device, both the rights issuer and the device must register with each other. For this purpose a Rights Object Acquisition Protocol (ROAP) is specified in the OMA DRM 2.0 standard. ROAP includes several DRM security mechanisms performed between the rights issuer and a DRM capable device. One of those security mechanisms specified by ROAP is an interactive 4-pass registration protocol. The registration protocol is generally only executed at first contact between the device and the rights issuer, but may also be executed one or more times after the first contact (e.g., when there is a need to update the exchanged information). The registration protocol specified in the OMA DRM 2.0 standard includes negotiations of protocol parameters and protocol version, cryptographic algorithms, exchange of certificate preferences, an optional exchange of the certificates, and the like.

FIG. 1 visualizes the 4-pass registration protocol between a device 10 and a rights issuer server 12 according to the OMA DRM 2.0 approach. In a first step the device 10 sends a DeviceHello message to the rights issuer server 12 to initiate the registration. The DeviceHello message includes device information (such as a device ID and cryptographic algorithms supported by device) and device preferences. In response to receipt of the DeviceHello message, the rights issuer server 12 sends an RIHello message back to the device 10. The RIHello message expresses preferences of the rights issuer as well as decisions performed by the rights issuer based on the information supplied with the DeviceHello message. In a third step the device 10 sends a RegistrationRequest message to the rights issuer server 12. With this message, further information is supplied to rights issuer server 12 such as a request time (i.e., the current DRM time as measured by the device 10) and a certificate chain parameter. The registration protocol ends with a RegistrationResponse message that is sent from the rights issuer server 12 to the device 10. The RegistrationResponse message includes status information, the Universal Resource Locater (URL) of the rights issuer server 12 and further information such as Online Certificate Status Protocol (OCSP) information. The OCSP information is obtained from the rights issuer server 12 during a 2-pass handshake procedure (steps a and b in FIG. 1) with an OCSP responder server 14 in the service network. The OCSP handshake procedure is executed to check whether the certificate provided by the device 10 to the rights issuer server 12 is still valid (the OCSP responder server keeps a list of revoked certificates).

In the OMA DRM 2.0 standard, the registration protocol is performed in context with generating a rights issuer context that enables the device 10 to successfully participate in further protocols of the ROAP suite, including protocols for requesting and acquiring rights objects that include information necessary to decrypt encrypted digital content. Only after the 4-pass registration protocol of FIG. 1 has been successfully concluded, the rights issuer server 12 can protect rights objects for the device 10. Successful completion of the registration protocol thus provides the device 10 with registration information negotiated with the rights issuer server 12 and required to use (e.g., play, hear or watch) protected content (that may have been received from a network component different from the rights issuer server 12).

Although the registration protocol described with reference to FIG. 1 reliably allows to establish a rights issuer context in the device 10, several drawbacks of this registration approach have become apparent. For example, while the digital content can be distributed over downlink-only channels to the device 10, the registration procedure shown in FIG. 1 always requires an interactive communication (and thus an uplink channel) from the device 10 to the rights issuer server 12. For this reason the registration protocol of FIG. 1 cannot be utilized in combination with systems only having a downlink channel (e.g., a broadcast system like Digital Video Broadcast, or DVB).

In Pekka Lahtinen, Maarten Muijen, "IPDC Services Purchase and Protection. Joint Response to the DVB CfT by Digita, Elisa, MTV Oy, NEC, Nokia, Phillips, Siemens, Swelcom, Telecom Italia Lab, TeliaSonera, T-System and Vodafone", Version 1.0" a 1-pass ROAP for registering an OMA DRM 2.0 compliant device with a rights issuer is proposed. According to this proposal the registration information is constructed by the device itself.

Accordingly, there is still a need for a registration technique that does not necessarily require an interactive communication in order to provide the device with registration information required to utilize protected content and that does not burden the device with excessive DRM processing operations.

SUMMARY OF THE INVENTION

According to a first aspect of the invention, a method of registering a device with a rights issuer system in a digital rights management context is provided that comprises the steps of generating registration information, comprising acquiring rights issuer information, receiving device information and generating the registration information from the rights issuer information and the device information, wherein the registration information includes information (directly or indirectly) required to use protected content. The registration information is then transferred towards the device.

The device information may be received individually for the particular device for which registration information is to be generated or it may received as a bulk of information relating to different device types. The received device information may be stored temporarily or (e.g., in a database) for a longer period of time.

The registration information may be transferred to the device either directly or it may be transferred to the device via one or more intermediate network components arranged between the sender of the registration information and the device. According to a first variant, the registration information is transferred during an online session with the device or in a broadcast mode. This might require that the device is online or in an active mode. According to a second variant, the registration information is transferred towards the device while the device is at least one of offline, inactive and switched-off.

As the invention can be practised (even) when the device is offline, inactive and/or switched-off, the device information may be received by the component generating the registration information from an information source that is different from the device. This information source may be a dedicated server operated by a device manufacturer or by a network operator that has been provided with the device information.

The invention can be practised by different network entities. According to a first option, the method is performed by a rights issuer server or a network operator server. According to a further option, the method is performed by an intermediate network component arranged between a rights issuer server and the device. The intermediate network component may acquire the rights issuer information from the rights issuer server or from any another network component.

If the registration information has been generated by the rights issuer server, the registration information may be transferred towards the device by transmitting the registration information to an intermediate network component. The intermediate network component is thus enabled to forward the registration information to the device. If the intermediate network component does not receive the complete registration information but only the rights issuer information, it may additionally acquire the device information and generate the registration information by itself based on the device information and the rights issuer information.

The registration information may be transferred by different techniques from the intermediate network component to the device. According to a first variant, the registration information is transferred to the device via a short-range transmission technique that may be wired (i.e., a cable) or wireless (e.g, via Bluetooth, WLAN or an infrared (IR) technique). Such a short-range transmission technique may also be used for transmitting, from the device to the intermediate network component, the device information required for generating the registration information. Instead of using a short-range transmission technique, a removable and, optionally, re-writable storage medium (such as a hard disc drive or a SIM card, an SD card or any other storage card) may be used for transferring the registration information to the device. To this end, the registration information may be stored in a first step on the removable storage medium, and in a second step the device may be provided with access to the removable storage medium.

Alternatively, or additionally, a removable storage medium may be used for transferring the device information. In other words, the device information required to generate the registration information may be stored on and read from the removable storage medium. This approach may include transferring the device information from the removable storage medium to a network component (e.g., to a user-operated personal computer and/or a rights issuer server) for generating the registration information, receiving the generated registration information from this network component, and writing the received registration information on the removable storage medium. Of course, the device information may additionally or alternatively be entered via a keyboard or any other user-operated input device.

The step of transferring the registration information towards the device may be performed at various stages of the device life-cycle. For example, the registration information may be transferred before deliverance of the device to an end-user. Accordingly, the registration information may be conveyed to the device already upon manufacture or shortly before delivering the device to the end-user (e.g., by flashing it into the device software or by writing it on a removable storage medium that is delivered together with the device or thereafter). Other variants for transferring the registration information towards the device include provisioning of the registration information via a downlink transmission (e.g., in a non-interactive manner) or via a unidirectional communications link (e.g., during a broadcast session).

The registration information that is transferred towards the device may be signed and/or encrypted. To this end, a private key of the rights issuer or a public key associated with the device may be utilized.

As practicing the invention does not necessarily require an interaction between the device and the rights issuer server, a mechanism for setting or synchronizing DRM timing information (like the DRM time and/or OCSP time) would be useful. To this end, the rights issuer server (or any intermediate network component) may receive DRM timing information from a further network server such as a trusted OCSP responder server. The received DRM timing information may be utilized locally and may additionally be forwarded to the device for time synchronizing or time setting purposes.

The invention may be performed in various DRM contexts. Such contexts may comprise the broadcast of encrypted content or the transfer of encrypted content to the device via a unidirectional or bidirectional communications link. The encrypted content may be received from the rights issuer server, from a network component different therefrom, or by any other means (including removable storage media such as DVDs or CD-ROMs).

The registration information may relate to device settings commanded by the rights issuer server. In one variation, the registration information may comprise one, more, or all of a URL of the rights issuer, an identifier of the rights issuer, a selected protocol version, a selected algorithm, a certificate caching indication, and an expiry time. The device information may comprise one, more or all of a device certificate, a device identity, and an indication of device capabilities.

The invention may be embodied as a piece of hardware, as a piece of software or as a combination thereof. As regards a software implementation, the invention provides a computer program product comprising program code portions to perform the steps of the methods described herein when the computer program product is run on one or more computing devices. The computer program product may be stored on a computer-readable recording medium.

In another variation, the invention is embodied in an apparatus for registering a device with a rights issuer system in a digital rights management context, the apparatus comprising a registration information generator with a storage component for at least temporarily storing rights issuer information, an interface for receiving device information, and a processor for generating the registration information from the rights issuer information and the device information, wherein the registration information includes information that permits to use protected content. The apparatus further comprises an interface for transferring the registration information towards the device.

BRIEF DESCRIPTION OF THE DRAWINGS

In the following the invention will be described with reference to exemplary embodiment illustrated in the Figures, in which.

DETAILED DESCRIPTION OF PREFERRED EMBODIMENTS

In the following description, for purposes of explanation and not limitation, specific details are set forth such as particular signal formats, messaging protocols, etc. in order to provide a thorough understanding of the current invention. It will be apparent to one skilled in the art that the current invention may be practiced in other embodiments that depart from these specific details. For example, the skilled artisan will appreciate that the current invention may be utilized in connection with DRM standards different from the OMA DRM 2.0 standard (or later versions thereof) discussed below to illustrate the present invention. Moreover, those skilled in the art will also appreciate that functions explained herein below may be implemented using individual hardware circuitry, using software functioning in conjunction with a programmed microprocessor or general purpose computer, using an Application Specific Integrated Circuit (ASIC), and/or using one or more Digital Signal Processors (DSPs). It will also be appreciated that while the current invention is primarily described as a method, it may also be embodied in a system comprising a computer processor and a memory coupled to the processor, wherein the memory is encoded with one or more programs that may perform the methods disclosed herein.

Figure 2:
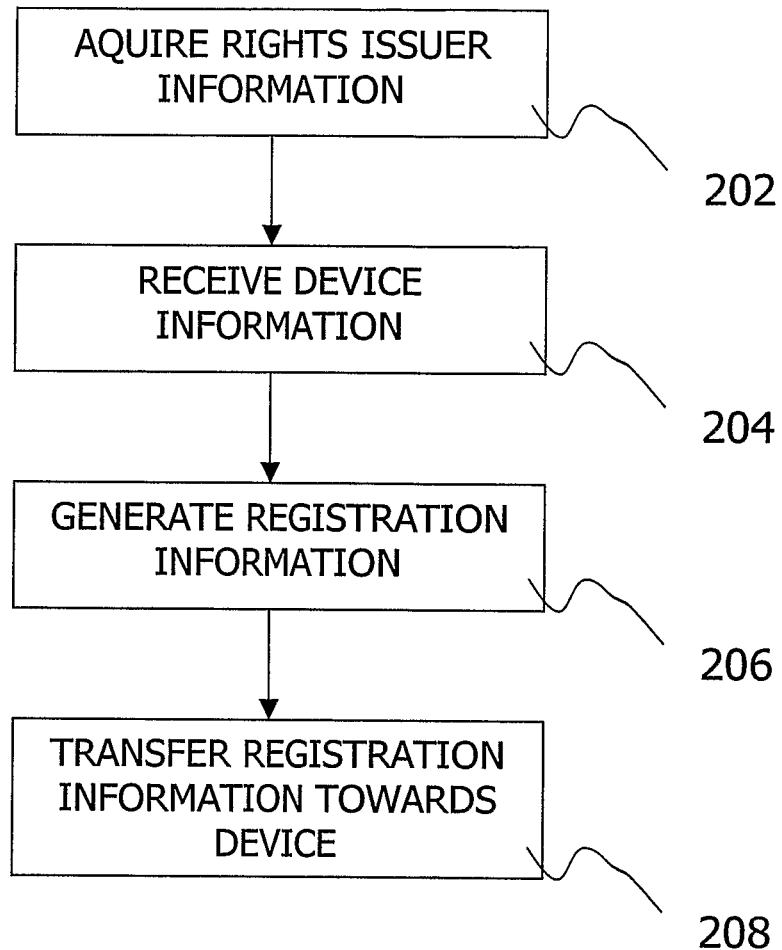
FIG. 2 is a process flow diagram showing a method embodiment of the present invention.

With reference to FIG. 2, a flow chart 200 shows the individual steps of a method embodiment for registering a device with a rights issuer system in a digital rights management context. In a first step 202 rights issuer information is acquired. Acquiring the rights issuer information may include receiving the rights issuer information over a communications network. Alternatively, or in addition, it may include generating (or determining) the rights issuer information locally (e.g., reading it from a database). The rights issuer information may include details about a particular rights issuer such as a URL of the rights issuer, an identifier of the rights issuer, cryptographic algorithms supported by the rights issuer, and so on.

In a next step 204 device information is received. The device information may include information such as a device unique certificate including a routed certificate chain, a device identifier (such as a hash of the encoded device public key), and information about the device capabilities (including information about the cryptographic algorithms supported by the device). Step 204 may be performed such that the device information is received for one or more individual devices only. Alternatively, the device information may be received in step 204 for a larger variety of device types (and may be stored after receipt in a local database). The steps 202 and 204 may be performed in any order or simultaneously.

Once the device information has been received, the registration information is generated in step 206 based on both the rights issuer information acquired in step 202 and the device information received in step 204. The registration information generated in step 206 includes information required by the device to use protected content. In an exemplary OMA DRM 2.0 scenario, the registration information may comprise or consist of the rights issuer context with the URL of the rights issuer, the identifier of the rights issuer, the selected protocol version, the selected cryptographic algorithms, a certificate cashing indication (indicating whether the rights issuer has stored the device certificate) and a rights issuer context expiry time (except for so-called "unconnected devices" as defined in the OMA DRM 2.0 standard, for which this time is infinite). Optionally, the rights issuer context may additionally include rights issuer certificate validation data and an OCSP responder key as well as a current set of OCSP responses.

In an alternative scenario, the registration information may comprise one or more cryptographic keys required to decrypt encrypted digital content. In a still further scenario compliant with the UMA DRM 2.0 scenario, the registration information includes device settings commanded by rights issuer server 12.

In a further (final) step 208 the registration information (such as the rights issuer context) is transferred to the device. Step 208 can be performed in various variants. According to a first variant, the device is provided with registration information upon manufacture thereof. As an example, the registration information may be hard coded into the ROM or firmware of the device and may thus remain unchangeable during the whole device lifetime. The registration information may also be flashed into the device during manufacture.

According to a further variant, step 208 is performed after the device has been manufactured but before the deliverance of the device to the end user. In this case, the registration information may be included into the software image that is flashed into the device to customize it for the end user. This option would be of particular interest for network operators who anyway customize the software of the devices (such as mobile telephones) distributed to the end users.

According to a third variant, the registration information is provided to the device via a removable storage medium (such as a mini hard disc drive, a SIM card or any other memory card) or via a short-range transmission technique such as a cable or a wireless technique (including Bluetooth, WLAN or IR). In such a scenario a user may initiate the generation of the registration information via a communications network on a remote network component (like a web server/web portal of a network operator or of a rights issuer). The user downloads the registration information generated for his/her device on a local intermediate network component (such as a personal computer) and transfers it via a removable storage medium or a short-range transmission technique onto the device. If a removable storage medium is used, no online connection with the device is required. The device may even be switched-off.

The device information required for generating the registration information may be transferred from the device (via an intermediate network component) to the rights issuer server, a network operator server or any other server arranged within a communications network. To this end, the user may first transfer the relevant device information from the device via a short-range transmission technique or a removable storage medium to his/her local intermediate network component, connect to the server, transmit the device information to the server and receive the registration information (that has been generated by the server) via the communications network. In a final step the user transfers the registration information from the local intermediate network component onto the device. Alternatively, the user may receive the rights issuer information (via the communications network from the rights issuer server) and the device information (e.g., from the device) onto his/her local intermediate network component and generate the registration information locally.

The above variants of transferring registration information towards the device do not necessarily require that the device is active, switched-on or online. There exist further variants that require that the device is in an online mode or switched-on. In an online scenario the registration information may be transferred towards the device via a unidirectional or bidirectional connection that allows for a downlink transmission of the registration information (e.g., during a device management interaction). Device management (DM) protocols (different from ROAP) such as the Sync ML DM protocol V. 1.1.2 or the OMA "Firmware Update Management Object" approach may be used to install the registration information online on the device.

According to a still further variant, step 208 includes provisioning the registration information to the device via a unidirectional communications link such as a broadcast channel. This variant also requires a reachable device (i.e., a device that is at least switched-on). As in a broadcast scenario all active devices could receive the (usually device specific) registration information, the broadcast registration information may be protected so that only the single legitimate receiving device may use it. To this end the broadcast registration information may be encrypted (e.g., with a public key of the device).

Figure 1:
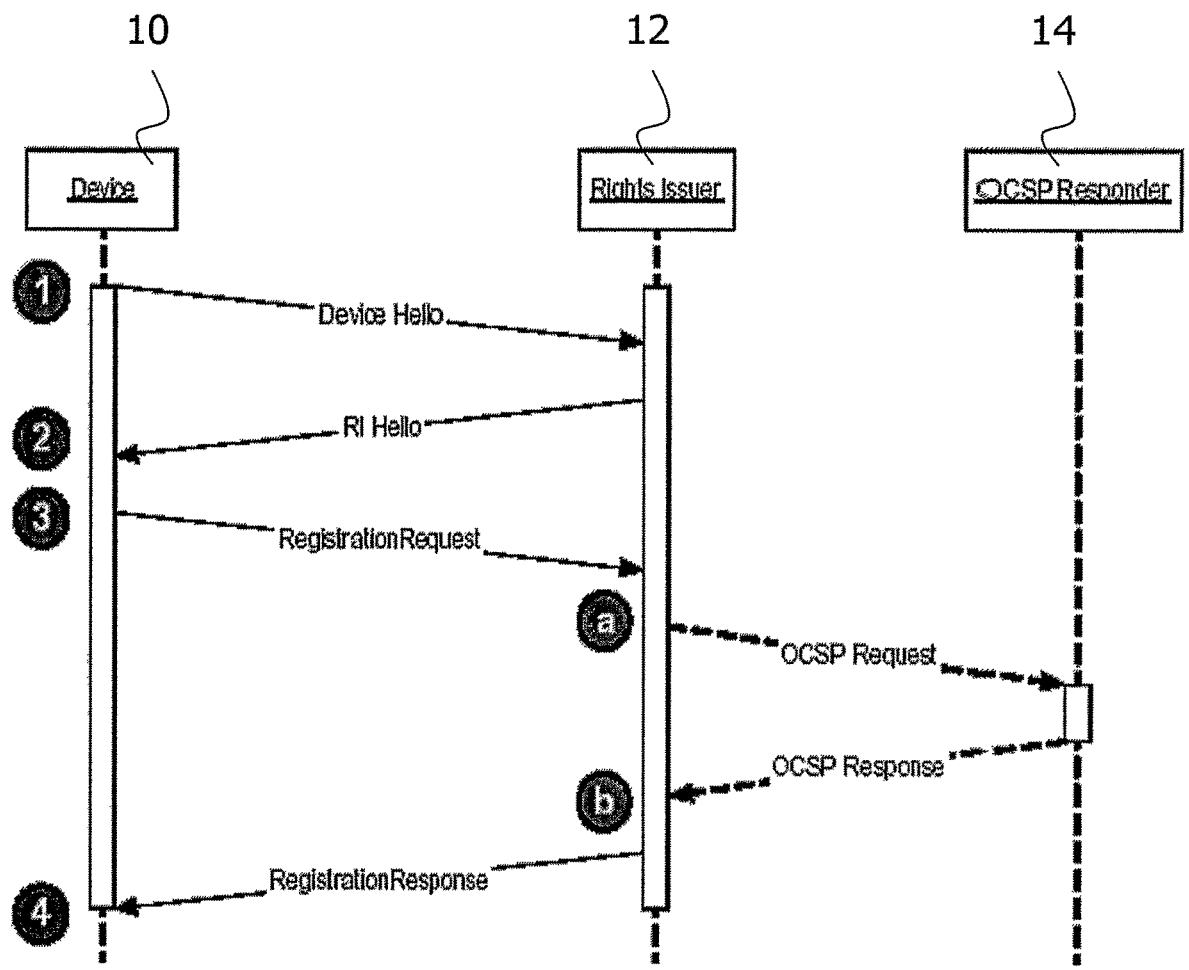
FIG. 1 is a schematic signalling diagram showing the interactive 4-pass registration protocol according to the OMA DRM 2.0 standard.

In all of the above variants the inherent security of the 4-pass registration protocol depicted in FIG. 1 may not be fully guaranteed. Any loss in security can at least partially be compensated by securing the registration information that is transferred towards the device. Securing the registration information can be performed in various ways. One option would be to apply a signature with the private key of the rights issuer (that can be verified by the device with the public key certificate of the rights issuer) to the registration information. Also, any of the encryption techniques described above may be utilized.

Often, the validity (and usability) of protected digital content is linked to a DRM time (e.g., the use of protected content may be restricted to a limited period of time). Replacing the 4-pass registration protocol as defined in the OMA DRM 2.0 standard may require a novel mechanism for setting or synchronizing the DRM time in case it deviates between the device and the rights issuer server. To allow for a time setting and/or timing synchronization between the rights issuer server (or any other server having a similar functionality) and the device, the OCSP time may be included in the registration information (rather than just the rights issuer DRM time, which may not be secure and possibly inaccurate). The OCSP time may then be used by both the rights issuer server and the device for setting the DRM time and thus for synchronizing DRM timing.

Figure 3:
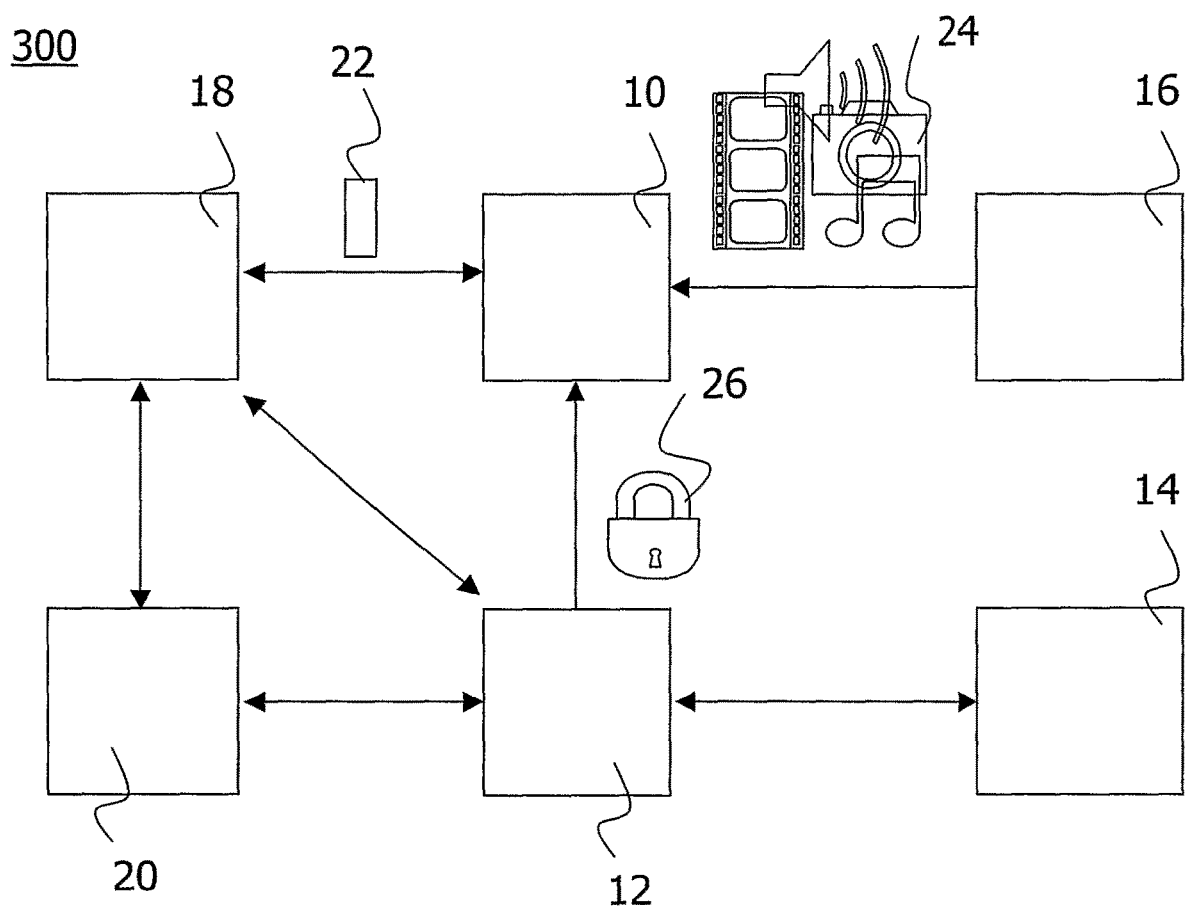
FIG. 3 is a schematic diagram showing a system embodiment of the present invention.

FIG. 3 shows a DRM system 300 in which the above methods may be practised. The DRM system 300 includes a DRM capable device 10 (such as a mobile telephone, a personal digital assistant, or a DVB capable television set), a rights issuer server 12, an OCSP responder server 14, a content provider server 16, an intermediate network component 18 (such as a personal computer that may be co-located with the device 10), and a DRM capability server 20. The DRM capability server 20 is a dedicated server that is configured to provide device information about the device 10 to one or both of the intermediate network component 18 and the rights issuer server 12. It should be noted that in some embodiments not all of the components shown in FIG. 3 will be required to practise the invention.

The device 10 communicates with the content provider server 16 and the rights issuer server 12 via a network connection (e.g., via the Internet). The communication between the device 10 and the content provider server 16 may aim at transferring digital content 24 (that may be encrypted) to the device 10. During the communication between the device 10 and the rights issuer server 12 registration information 26 that is required to make use of the digital content 24 may be transferred.

The communication between the device 10 and the intermediate network component 18 may be performed via a removable storage medium 22 such as a SIM card, via a cable or via a short-range transmission technique. Communication between the intermediate network component 18 on the one hand and one or both of the DRM capability server 20 and the rights issuer server 12 on the other hand may take place via a network connection (e.g., via the Internet). The rights issuer server 12 may be co-located with one or both of the DRM capability server 20 and the OCSP responder server 14, or it may communicate with one or both of these components via a network connection (e.g., the Internet or an intranet).

Figure 4:
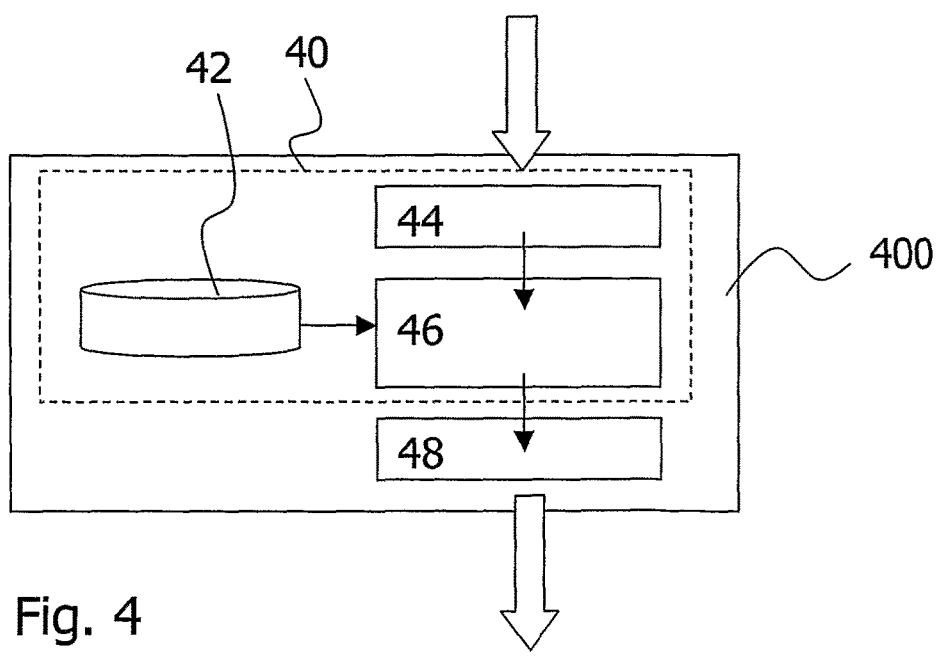
FIG. 4 is a schematic diagram showing an apparatus embodiment of the present invention

The rights issuer server 12 or the intermediate network component 18 (or both) may have an internal configuration as shown in FIG. 4. In FIG. 4 an apparatus 400 for registering the device 10 with the rights issuer server 12 is depicted. The apparatus 400 includes a registration information generator 40 with a storage component 42 for at least temporarily storing rights issuer information, an interface 44 for receiving device information, and a processor 46 for generating the registration information from the rights issuer information and the device information. The apparatus 400 further comprises an interface 48 capable of transferring the registration information towards the device 10. The registration information includes information (e.g., a rights issuer context for the device 10) that permits the use of protected content.

In the following, several exemplary registration messaging scenarios involving subsets of the components shown in FIG. 3 will be discussed in more detail.

Figure 5:
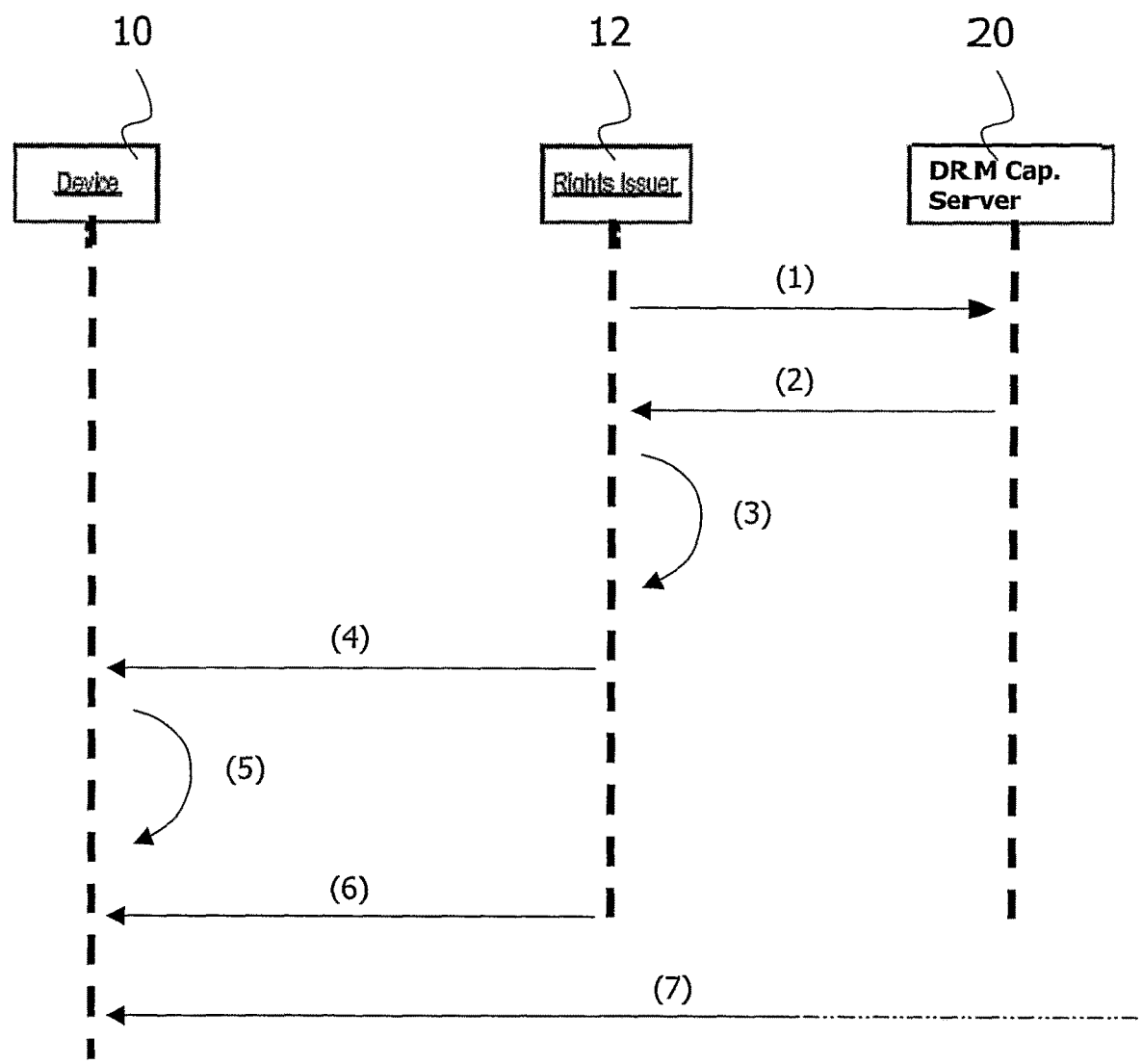
FIG. 5 is a first signalling diagram showing a technique relating to the transfer of registration information according to another embodiment of the present invention.

FIG. 5 depicts a registration messaging scenario involving the device 10, the rights issuer server 12 and the DRM capability server 20. In a first messaging step the rights issuer server 12 transmits a device identifier for the device 10 to the DRM capability server 20. Based on the received device identifier the DRM capability server 20 looks up device information (such as a device certificate and device capabilities). The device information looked up by the DRM capability server 20 is returned via a second message to the rights issuer server 12. Based on the rights issuer information already available to the rights issuer server 12 and the device information received from the DRM capability server 20, the rights issuer server 12 generates registration information (step 3). In step 4 the registration information is transferred towards the device 10 using any one of the transfer techniques described above.

In a fifth step the device 10 stores the registration information locally. If the device 10 is compliant with the OMA DRM 2.0 standard, storing the registration information generates or establishes a rights issuer context. Once the rights issuer context has been established, the device 10 is prepared for receiving a rights object including a key required to decrypt and use protected content (step 6). With the key included in the rights object received in step 6, the device 10 is enabled to decrypt protected content that may be received in step 7 from the content provider server 16 (not shown) or any other content source.

Figure 6:
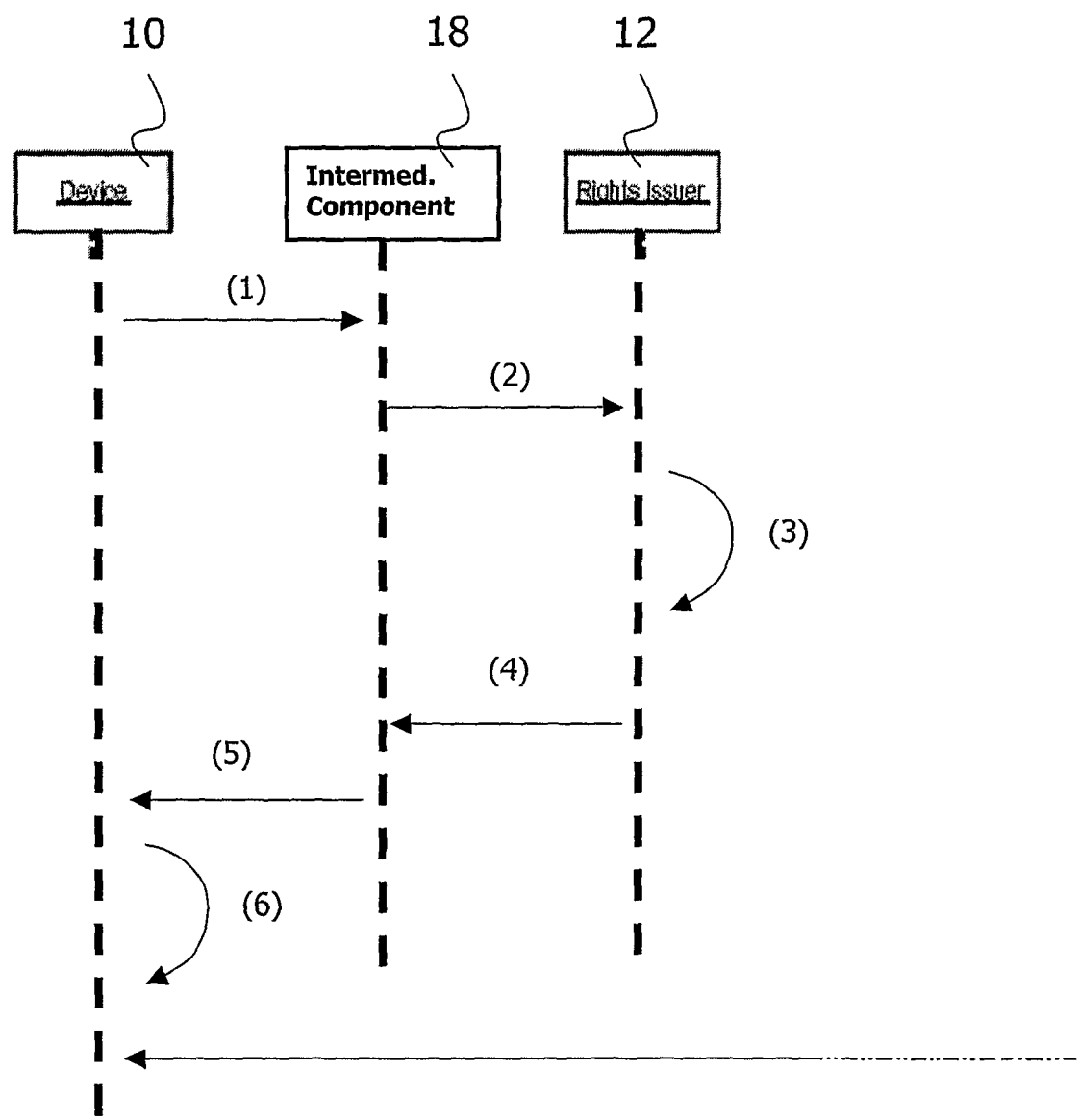
FIG. 6 is a second signalling diagram showing a technique relating to the transfer of registration information according to a further embodiment of the present invention.

FIG. 6 illustrates a further messaging scenario for registering a DRM capable device 10 with a rights issuer server 12. The scenario shown in FIG. 6 additionally involves an intermediate network component 18 instead of the DRM capability server shown in FIG. 5.

In a first step device information is transferred from the device 10 to the intermediate network component 18 by any one of the techniques described above (e.g., using a removable storage medium, a cable or a short-range wireless technique). The device information is forwarded by the intermediate network component 18 to the rights issuer server 12 (step 2). In a next step the rights issuer server 12 generates registration information based on the received device information and locally available rights issuer information. The registration information thus obtained is then transferred from the rights issuer server 12 towards the device 10. This transfer includes a first leg between the rights issuer server 12 and the intermediate network component 18 (step 4) and a second leg between the intermediate network component 18 and the device 10 (step 5). In further step the device 10 stores the received registration information. Further steps like the transmission of a key to decrypt protected content and the transmission of protected content encrypted with that key may follow (not shown).

To enhance DRM security (e.g., to protect against replay, man-in-the-middle attacks, and non-fresh sessions), the registration information that is sent to the device 10 (step 4 in FIG. 5 and steps 4 and 5 in FIG. 6) may be protected. To this end the registration information can be signed with a private key (e.g., the private key of the rights issuer) that can be verified with the corresponding public key certificate by the device 10. Additionally, or in the alternative, encryption technologies may be employed.

For DRM timing synchronization or setting purposes, it may further be envisaged to convey the OCSP time (that may be obtained by the rights issuer server 12 from the OCSP responder server 14) in a separate message or together with the registration information to the device 10.

As has become apparent from the above, the invention allows to provide a DRM capable device with registration information that has been generated taking into account device-specific capabilities without requiring an interactive registration procedure with the device. This permits the use of the OMA DRM 2.0 standard or any other DRM standards in context with devices and systems that do not support an interactive feedback channel, or where it is not feasible or not preferable to use such a channel for DRM registration. In particular, the OMA DRM 2.0 standard or similar standards may thus be extended to broadcast scenarios. Additionally, the registration information may be pre-installed (e.g., for a particular network operator web portal) before the device is delivered to the end user.

While the current invention has been described in relation to its preferred embodiments, it is to be understood that this disclosure is only illustrative. Accordingly, it is intended that the invention be limited only by scope of the claims appended hereto.

The invention claimed is:

1. A method of registering a device with a rights issuer system in a digital rights management context, the method comprising the steps of:
   generating registration information, comprising acquiring rights issuer information;
   receiving device information, the device being in at least one of an offline state, an inactive state and a switched-off state;
   generating the registration information from the rights issuer information and the device information, wherein the registration information includes information required by the device to use protected content; and
   transferring the registration information towards the device while the device is in the at least one of an offline state, an inactive state and a switched-off state, wherein the transferring the registration information towards the device is performed before deliverance of the device to an end user, and wherein the registration Information is transferred towards the device during device manufacture.

2. The method of claim 1, wherein the registration information is transferred towards the device via a removable storage medium on which the registration information is stored.

3. The method of claim 1, wherein the device information is received on a removable storage medium.

4. The method of claim 1, wherein the steps are performed by an intermediate network component that is arranged between a rights issuer server and the device and wherein acquiring the rights issuer information includes receiving the rights issuer information from the rights issuer server.

5. The method of claim 4, wherein the step of generating the registration information is performed by the intermediate network component based on the device information and the rights issuer information.

6. The method of claim 4, wherein the registration information is transferred from the intermediate network component to the device using a removable storage medium.

7. The method of claim 4, further comprising the step of receiving, by the intermediate network component, the device information via a removable storage medium from the device.

8. The method of claim 1, wherein the steps are performed by a rights issuer server.

9. The method of claim 8, wherein the step of transferring the registration information towards the device comprises transmitting the registration information or at least the rights issuer information to an intermediate network component to enable the intermediate network component to transfer the registration information towards the device.

10. The method of claim 1, wherein the step of transferring the registration Information to the device comprises:
   storing the registration information on a removable storage medium; and
   providing the device with access to the removable storage medium.

11. The method of claim 10, wherein the device information required to generate the registration information is stored on and read from the removable storage medium.

12. The method of claim 11, further comprising the steps of:
   transferring the device information from the removable storage medium to a network component for generating the registration information;
   receiving the registration information from the network component; and
   writing the received registration information on the removable storage medium.

13. The method of claim 1, wherein the step of transferring the registration information towards the device comprises flashing the registration information into the device.

14. The method of claim 1, further comprising the step of at least one of signing and encrypting the registration Information.

15. The method of claim 14, wherein the registration information is signed with a private key of the rights issuer and/or encrypted with a public key associated with the device.

16. The method of claim 1, further comprising the steps of:
   receiving digital rights management timing information from a network server; and
   transferring the received digital rights management timing information to the device.

17. The method of claim 1, wherein the method is performed in a digital rights management context that comprises the broadcast of encrypted content.

18. A system comprising a device and an apparatus for registering the device with a rights Issuer system in a digital rights management context, the apparatus comprising:
   a registration information generator, comprising a storage component for at least temporarily storing rights issuer information;
   an Interface for receiving device information;
   processor for generating the registration information from the rights issuer information and the device information, wherein the registration information includes information required by the device to use protected content; and
   an interface for transferring the registration information towards the device, the device being configured to be in at least one of an offline state, an inactive state and a switched-off state during reception of the device information by the apparatus and during reception of the registration information by the device from the apparatus, wherein transferring the registration information towards the device is performed before deliverance of the device to an end user, and wherein the registration Information is transferred towards the device during device manufacture.

19. The system of claim 18, further comprising means for flashing the registration information to the device.

20. The system of claim 18, wherein the system is a manufacturing system.

21. The system of claim 18, further comprising a removable storage medium including the registration information, the device having access to the removable storage medium.

* * * * *